US009206349B2

United States Patent
Turakhia et al.

(10) Patent No.: US 9,206,349 B2
(45) Date of Patent: Dec. 8, 2015

(54) POWDER COATED PROPPANT AND METHOD OF MAKING THE SAME

(75) Inventors: Rajesh Turakhia, Lake Jackson, TX (US); Jeffery L. Reynolds, Lake Jackson, TX (US); George Jacob, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 586 days.

(21) Appl. No.: 12/935,987

(22) PCT Filed: Mar. 24, 2009

(86) PCT No.: PCT/US2009/038005
§ 371 (c)(1),
(2), (4) Date: Oct. 1, 2010

(87) PCT Pub. No.: WO2009/129025
PCT Pub. Date: Oct. 22, 2009

(65) Prior Publication Data
US 2011/0024129 A1 Feb. 3, 2011

Related U.S. Application Data

(60) Provisional application No. 61/045,632, filed on Apr. 17, 2008.

(51) Int. Cl.
*C09K 8/80* (2006.01)
(52) U.S. Cl.
CPC ..................................... *C09K 8/805* (2013.01)
(58) Field of Classification Search
None
See application file for complete search history.

(56) References Cited

U.S. PATENT DOCUMENTS

| | | | |
|---|---|---|---|
| 3,854,533 A | 12/1974 | Gurley et al. | |
| 3,867,986 A | 2/1975 | Copeland | |
| 4,829,100 A | 5/1989 | Murphey et al. | |
| 4,869,960 A | 9/1989 | Gibb et al. | |
| 4,925,901 A | 5/1990 | Bertram et al. | |
| 5,422,183 A | 6/1995 | Sinclair et al. | |
| 5,604,184 A | 2/1997 | Ellis et al. | |
| 5,697,440 A | 12/1997 | Weaver et al. | |
| 5,837,656 A | 11/1998 | Sinclair et al. | |
| 5,871,049 A | 2/1999 | Weaver et al. | |
| 6,172,011 B1 | 1/2001 | Card et al. | |
| 6,184,311 B1 * | 2/2001 | O'Keeffe et al. | 525/438 |
| 6,209,643 B1 | 4/2001 | Nguyen et al. | |
| 6,280,798 B1 * | 8/2001 | Ring et al. | 427/459 |
| 7,135,231 B1 * | 11/2006 | Sinclair et al. | 428/407 |
| 2003/0091830 A1 | 5/2003 | Blomer et al. | |
| 2003/0224165 A1 | 12/2003 | Anderson et al. | |
| 2004/0154796 A1 * | 8/2004 | Nguyen | 166/278 |
| 2005/0019574 A1 * | 1/2005 | McCrary | 428/403 |
| 2005/0194141 A1 | 9/2005 | Sinclair et al. | |
| 2006/0035790 A1 | 2/2006 | Okell et al. | |
| 2007/0144736 A1 * | 6/2007 | Shinbach et al. | 166/250.1 |
| 2007/0209794 A1 * | 9/2007 | Kaufman et al. | 166/276 |
| 2010/0282468 A1 * | 11/2010 | Willberg et al. | 166/305.1 |

FOREIGN PATENT DOCUMENTS

| | | |
|---|---|---|
| RU | 2303616 | 7/2007 |
| WO | 2004092254 | 10/2004 |
| WO | 2008088449 | 7/2008 |

OTHER PUBLICATIONS

International Search Report and Written Opinion from related PCT application PCT/US2009/038005, dated Jun. 7, 2009, 10 pages.
International Preliminary Report on Patentability from related PCT application PCT/US2009/038005, completed Jun. 23, 2010, 13 pages.
Hester, et al. "Powder Coating Technology", Noyes Data Corporation, 1990, pp. 5-15.
Pieter Gillis De Lange, "Powder Coatings Chemistry and Technology", Coatings Compendia, 2nd edition, 2004, pp. 29-31 and 54-57.
Ulrich, "User's Guide to Powder Coating, Fourth Edition", Society of Manufacturing Engineers, Chapter 2, pp. 7-24, 2003, accessed via http://books.google.com/books?id=9nian0R4ieQC&Ipg=PR7&ots=IGWHo4QSCd&dq=User%E2%80%99s%20Guide%20to%20Powder%20Coating%20&lr&pg=PR4#v=onepage&q=User%E2%80%99s%20Guide%20to%20Powder%20Coating&f=true.
An Office Action in related Russian Application No. 2010146647, dated Jul. 16, 2013, 3 pgs.

* cited by examiner

*Primary Examiner* — Angela M DiTrani
(74) *Attorney, Agent, or Firm* — Brooks, Cameron & Huebsch, PLLC

(57) ABSTRACT

A process for producing a proppant particulate substrate having a coating layer thereon including the step of blending a proppant particulate substrate with a powder coating composition at a temperature sufficient to cause the powder coating composition to coat the proppant particulate substrate with a powder coating; and a proppant particulate substrate coated by such a process.

3 Claims, 3 Drawing Sheets

POWDER COATED PROPPANT AND METHOD OF MAKING THE SAME

CROSS REFERENCE TO RELATED APPLICATIONS

This is a §371 application of PCT International Patent Application Number PCT/US2009/038005 filed Mar. 24, 2009, and claims priority from provisional application Ser. No. 61/045,632 filed Apr. 17, 2008.

FIELD OF THE INVENTION

The present invention relates to proppant particulates and more specifically to coated proppant particulates and methods for making coated proppant particulates.

DISCUSSION OF BACKGROUND INFORMATION

To stimulate subterranean formations to enhance oil and gas production, fluid is pumped from the surface into an oil or gas bearing sub-surface at a rate and pressure sufficient, e.g. about 34 MPa-48.2 MPa, to cause a fracture of the subterranean formations. This process is commonly referred to as hydraulic fracturing. In a hydraulic fracturing process, proppant particulates (usually sand) are blended into the fluid and injected into the formation to fill and prop open the underground fracture to maintain the fracture in an open condition. The proppants create a permeable pathway through which oil and gas can flow into the oil bore. However, if the proppant particles pulverize in the fracture, then the resulting fines will reduce the flow of oil and gas flowing into the oil bore. And, if the proppant particles break free and flow with the oil and gas into the oil bore, then the hydraulically formed fractures can close and reduce the productivity of the well.

To prepare proppant particulates for hydraulic fracturing process, epoxy resin coatings have been used to coat proppant particulates. There are a number of patents teaching the use of epoxy coatings for proppants. Some of the patents describing the epoxy coatings are U.S. Pat. No. 3,854,533; U.S. Pat. No. 3,867,986; U.S. Pat. No. 4,829,100; U.S. Pat. No. 4,869,960; and U.S. Pat. No. 5,422,183.

A number of approaches have been used to minimize coating proppant fracture, disintegration, and the resulting fines. U.S. Patent Publication No. 2006/0035790 and U.S. Pat. No. 5,697,440 discuss the use of elastomeric coatings. U.S. Pat. No. 6,172,011 discusses incorporating fibrous materials on the proppant particulates. U.S. Pat. No. 5,604,184 discloses a method for opening a subsurface fracture using chemically inert resin coated proppant particulates. U.S. Pat. Nos. 5,871,049 and 6,209,643 describe the use of a tackifying compound with the proppant particulates. U.S. Patent Publication No. 2005/0194141 discloses the use of soluble fibers in the resin coating of the proppant particulates. U.S. Pat. No. 5,837,656 and U.S. Patent Publication No 2003/0224165 disclose the use of multilayer coatings on the proppant particulates. All of these teachings disclose the use of an additional raw material or an additional step in the process to minimize the generation of fines due to pulverization and brittle failure of the proppant particulates under pressure.

Proppant particles are epoxy coated by the process of blending proppant particles with a liquid mixture comprising an epoxy resin and an epoxy hardening agent at an elevated temperature until a free flowing coated proppant is produced. Despite the significant benefits provided by epoxy coated proppants, the process used to make epoxy coated proppants is complicated by the required liquid/solid processing.

SUMMARY OF THE INVENTION

The present invention provides a solution to the above-mentioned problems of the prior art proppant processes. The present invention provides a process to make epoxy coated proppants without liquid/solid processing. The present invention includes the discovery that proppants can be powder coated.

On aspect of the present invention is directed to a process for producing a proppant particulate substrate having a coating layer thereon, comprising the step of: blending a proppant particulate substrate with a powder coating composition at a temperature sufficient to cause the powder coating composition to coat the proppant particulate substrate with a powder coating.

Another aspect of the present invention is directed to a proppant particulate substrate having a coating thereon produced by the process of the present invention.

One embodiment of the present invention includes a "fully" cured epoxy coating (defined herein below as the coupling of more than 80% of the epoxy groups of the epoxy resin into the cured epoxy polymer); and another embodiment of the present invention includes a B-staged or partially cured (controlled cured) epoxy coating (defined herein below as conversion lower than the gel point of the coating).

DETAILED DESCRIPTION

Figure 1:
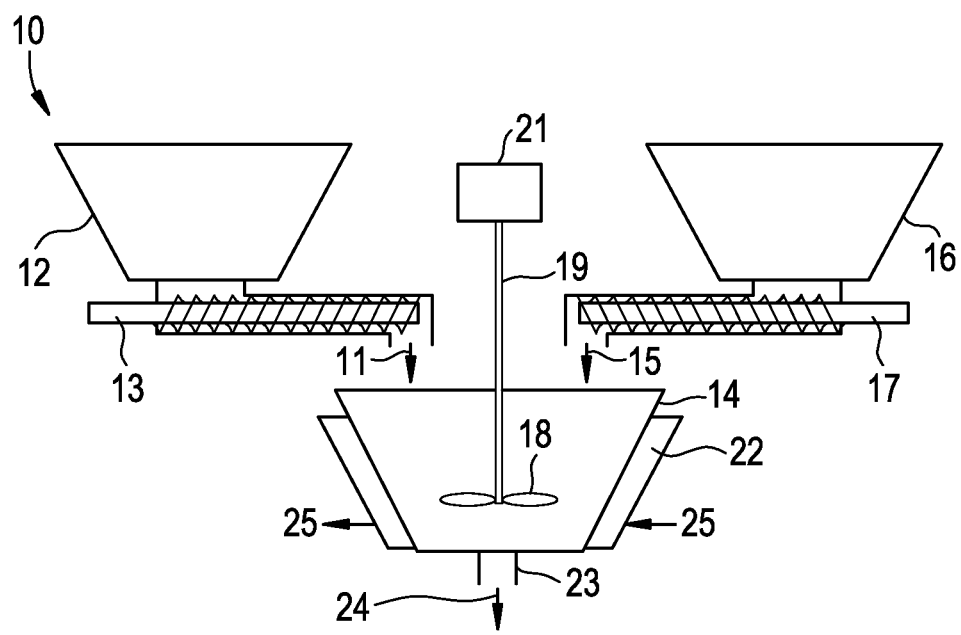
FIG. 1 is a schematic view showing the blending of a proppant particulate substrate with a powder coating composition in a heated mixing vessel (blender) with stirring.

Powder coating is a well known coating technology wherein, for example and without limitation thereto, a powder coating composition is applied to an object or substrate to be coated and then the object with the powder coating composition applied thereto is heated to cause the powder coating composition to flow onto the object to produce a coated object. The powder coating composition is ordinarily applied to the object by electrostatic spraying wherein the object to be coated is grounded and the powder coating composition is positively charged by a positively charged spray gun so that the sprayed powder coating composition is attracted to the object by electrostatic forces. Another alternate powder coating technology which is useful in the present invention is the use of fusion bonding of a solid powder resin or a formulation onto an object or a substrate.

Most powder coating compositions are based on thermoset polymer systems such as phenolic, polyester, polyester-epoxy, epoxy and acrylic thermosetting polymer systems. However, powder coating compositions can be based on thermoplastic polymer systems. Powder coating compositions typically contain pigments and flow modifiers. Epoxy based powder coating compositions typically contain a solid epoxy resin and a solid epoxy resin hardener. The following references describe various powder coating compositions and processes: Powder Coating Technology, by Charles I. Hester, Rebecca L. Nicholson, Margery A. Casssidy, Published in 1990 by Noyes Data Corporation, ISBN-13:978-0-8155-1246-2; and Powder Coatings Chemistry & Technology By Pieter Gillis de Lange, Published in 2004 by Vincentz Network, ISBN 3-87870-784-3, (3) User's Guide to Powder Coating by D. Ulrich (Editor), Published by the Society of Manufacturing Engineers.

The present invention includes the discovery that proppant particulate substrates can be powder coated. More specifically, the present invention is a process for producing a proppant particulate substrate having a coating layer thereon, comprising the step of: blending a proppant particulate substrate with a powder coating composition at a temperature sufficient to cause the powder coating composition to coat the proppant particulate substrate with a powder coating. The present invention includes a "fully" cured epoxy coating (defined herein as the coupling of more than 80% of the epoxy groups of the epoxy resin into the cured epoxy polymer); and in addition the present invention includes a B-staged or partially cured (controlled cured) epoxy coating (defined herein as conversion lower than the gel point of the coating).

The B-staged composition is designed to further cure in-situ in sub-surface formations and prevent back flow of proppant particles back up the well when the well is placed in production. The B-staged coated proppants further cure in the sub-surface by the way of curing and chemically bonding adjacent proppant particles into a monolithic porous network thus preventing the back flow of individual proppant particles.

The processing needs to achieve the extent of cure window as defined by a percentage range lower than the gel point of the epoxy powder formulation. The processing temperature used in the present invention is preferably in the range of from about 50° C. to about 200° C.

The thickness of the coating produced by the present invention is a function of the average diameter of the proppant particulate to be coated and the ratio of the amount of powder coating composition used to the amount of proppant particulate used and can be varied to suit individual requirements. However, the ratio of powder coating composition to proppant particulate on a weight percent basis is preferably in the range of from about 0.01 to about 0.1 or even as much as about 5.

It should be understood that although epoxy resin based powder coating compositions are preferred in the present invention, any powder coating composition, such as for example, epoxy-polyester hybrids, urethane-polyester hybrids, acrylic-urethanes hybrids, and epoxy-acrylic hybrids, can be used in the present invention. It should also be understood that although sand is the preferred proppant particulate substrate in the present invention, any proppant particulate substrate can be used in the present invention including natural and synthetic ceramics.

When the powder coating is an epoxy resin based powder coating, the powder coating composition consists of a solid epoxy resin and a curing agent. Examples of the epoxy resins useful for the present invention may include glycidyl polyethers of polyhydric phenols and polyhydric alcohols. As an illustration of the present invention, examples of the epoxy resins that may be used in the present invention include diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyltetrabromobiphenol, tetramethyltribromobiphenol, tetrachlorobisphenol A, isocyanate modified epoxy resin and any combination thereof. More preferred examples of epoxy resin may include diglycidyl ethers of bisphenol A and F, isocyanate epoxy resin, novolac epoxy resins, crystalline epoxy resins, and multifunctional epoxy resins.

Some non-limiting examples of commercial epoxy resins useful for the present invention may include or D.E.R.™ 662, D.E.R.™ 663U, D.E.R.™ 642U, D.E.R.™ 672U, D.E.R.™ 664UE, D.E.R.™ 6155, D.E.R.™ 6508, and D.E.R.™ 667 (D.E.R.™ is a trademark of The Dow Chemical Company). The epoxy resin level in the powder coating formulation in general may be from about 20 weight % to about 90 weight %; and more preferably from about 50 weight % to about 80 weight %.

The powder coating composition may also comprise a curing agent and a catalyst. The curing agent which is useful in the present may be any compound having an active group being reactive with the epoxide group of the epoxy resin. The curing agent useful in the present invention includes nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of those curing agents. Practically, polyamines, dicyandiamide, diaminodiphenylsulfone and their isomers, aminobenzoates, various acid anhydrides, phenol-novolac resins and cresol-novolac resins, for example, may be used in the present invention, but the present invention is not restricted to the use of these compounds. The curing agent level in the powder coating formulation in general may be from about 2 weight % to about 60 weight %; and preferably from about 5 weight % to about 30 weight %.

Any of the well-known catalysts described in U.S. Pat. No. 4,925,901, may be used in the present invention. As an illustration, examples of the known catalysts that may be used in the present invention include, for example, suitable onium or amine compounds such as ethyltriphenyl phosphonium acetate, ethyltriphenyl phosphonium acetate-acetic acid complex, triethylamine, methyl diethanolamine, benzyldimethylamine, and imidazole compounds such as 2-methylimidazole and benzimidazole. Epoxy adducts of the amine and imidazoles are more preferred for the powder coating application. The catalysts, when present, are employed in a sufficient amount to result in a substantially complete cure of the thermosettable resin, with some cross-linking. The catalyst level in the powder coating formulation in general may be from 0 weight % to about 10 weight %; and preferably from about 0.5 weight % to about 3 weight %.

The powder coating composition according to the present invention may optionally contain other additives such as fillers, dyes, pigments, thixotropic agents, surfactants, flow control agents, stabilizers, diluents that aid processing, adhesion promoters, flexibilizers, toughening agents, and fire retardants. The amount of the optional additives used in the thermosettable resin composition generally may be from 0 weight percent to 70 weight percent, preferably, from 0 to 50 weight percent depending on the final end use application. The filler level in the powder coating formulation in general may be from 0 weight % to about 60 weight %; and preferably from 0 weight % to about 40 weight %. The polymer of the powder coating compositions of the present invention can be essentially fully cured or partially cured. When the polymer coating of the present invention is partially cured, then the coating of the proppant particles can consolidate in-situ, complete polymerization in-situ and thereby prevent back flow of proppant particles back up the well when the well is placed in production.

Referring now to FIG. 1, therein is shown a coating process, generally indicated by numeral 10, wherein a powder coating composition 11 contained in powder coating composition bin 12 is conveyed by powder coating composition conveyer 13 into a mixing vessel, preferably jacketed, herein blender 14, to be blended with heated proppant particulate 15 contained in heated proppant particulate bin 16 and conveyed to the blender 14 by heated proppant particulate conveyer 17. Blender 14 is provided with blending paddles 18 mounted on shaft 19 and rotated by gear motor 21. The temperature of the heated proppant particulate substrate 15 is sufficient to cause the powder coating composition 11 to coat the heated proppant particulate substrate 15 with a powder coating. A cooling jacket 22 is provided near the outlet 23 of the blender 14 to cool the powder coated proppant particulate 24 before the coated proppant particulate 24 is flowed to a finishing operation. The cooling jacket 22 is cooled by the flow of coolant 25 therethrough.

Figure 2:
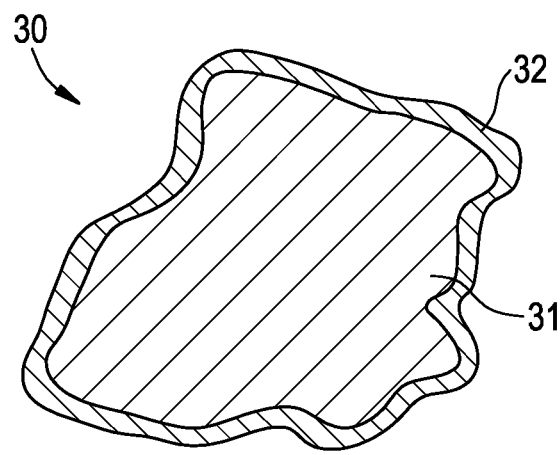
FIG. 2 is a cross-sectional view of a proppant particulate substrate having a powder coating thereon.

Referring now to FIG. 2, therein is shown a cross-sectional view of a coated proppant particulate, generally indicated by numeral 30, comprising a proppant particulate substrate 31 having a powder coating 32 thereon.

Figure 3:
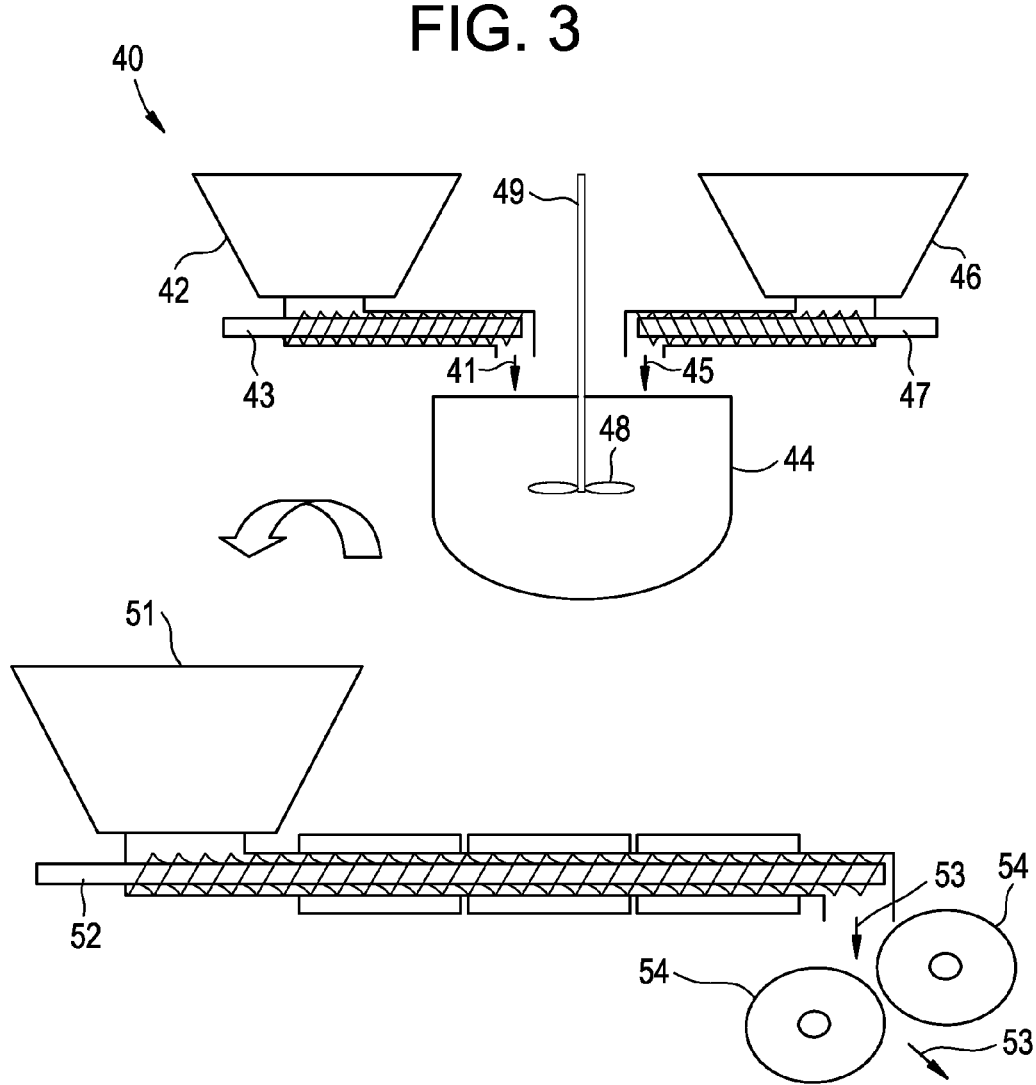
FIG. 3 is a schematic view showing the blending of a proppant particulate substrate with a powder coating composition in a pre-mixer followed by heating in an extruder.

Referring now to FIG. 3, therein is shown a coating process generally indicated by numeral 40, wherein a powder coating composition 41 contained in powder coating composition bin 42 is conveyed by powder coating composition conveyer 43 into a pre-mixer vessel, in this case a batch pre-mixer, herein blender 44, to be blended with proppant particulate 45 contained in proppant particulate bin 46 and conveyed to blender 44 by proppant particulate conveyer 47. Blender 44 is provided with blending paddles 48 mounted on shaft 49 and rotated by a gear motor (not shown). The blended material from the blender 44 is conveyed to pre-mix extruder hopper 51 and then through heated extruder 52. The heated extruder 52 may be a continuous extruder with a predetermined number of heated barrel zones. The coated proppant particulate 53 exiting from the heated extruder 52 is further processed by chilled rolls/belt flaker 54 and then flowed to a finishing operation.

Figure 4:
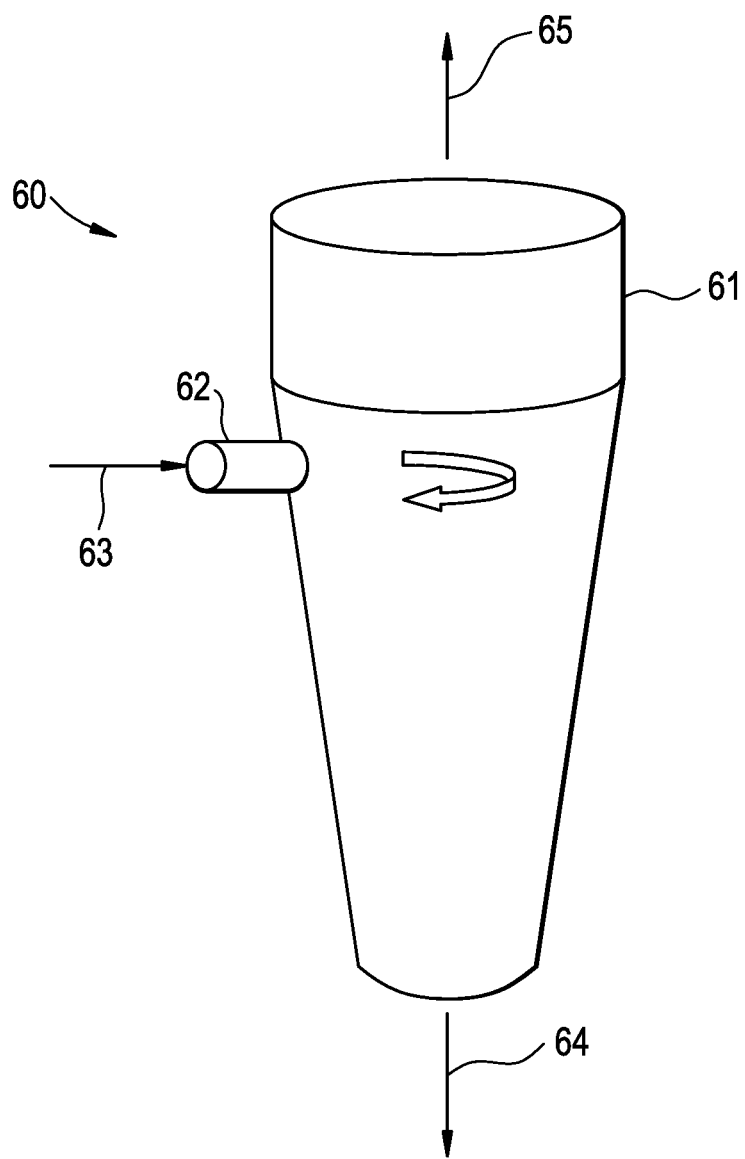
FIG. 4 is a side perspective view of a cyclone used to finish coated proppant particles.

Referring now to FIG. 4, therein is shown a side view of a cyclone apparatus, generally indicated by numeral 60, comprising a housing 61, and inlet 62 for a proppant inlet feed stream 63, a coated proppant outlet stream 64 and a vacuum outlet particle fines stream 65. The cyclone 60 is preferably used to finish the coated proppant particles flowed into the inside of the cyclone housing 61 by way of inlet 62. In use, cyclone 60 cools the coated proppants, prevents (or at least reduces) agglomeration of coated proppants and separates fine material from the bulk of the coated proppants. The coated proppants product stream 64 exits the housing 61 by way of the outlet stream 64; and the fines exit the housing 61 by way of outlet stream 65.

It should be understood that the proppant particulate substrate can be contacted with a powder coating composition by any suitable process. For example and without limitation thereto, proppant particulate substrate and a powder coating composition can be contacted in a fluidized bed reactor fed with hot air (or other hot gas) to promote mixing and coating; and then cold air to limit aggregate formation, to control the degree of curing of an epoxy powder coating composition and to remove any fine particles.

Example 1

A powder coating composition is prepared by blending 67.3 parts per hundred by weight (pph) of DER 664UE brand solid epoxy resin (commercially available from The Dow Chemical Company), with: 0.9 pph of AMICURE CG-1200 brand curing agent; 0.5 pph of EPIKURE P101 brand catalyst; 1 pph of MODAFLOW III brand flow modifier; and 30.4 pph of VANSIL W20 brand filler to produce a mixture which is extruded at 90° C., flaked, sieved, and then ground to a powder coating composition having an average diameter of about 30 micrometers. Then, 3 pph of the powder coating composition is blended with 97 pph of heated proppant sand at about 60° C. to about 140° C. for three to ten minutes and then cooled to produce an epoxy coating on the proppant sand.

In addition, 380 micrometer thick films are prepared by heating the powder coating composition to about 230° C. for two minutes so that tensile strength, percent break strain and modulus of the films can be determined by test method ASTM D638. The tensile strength of the film is about 56.2 MPa. The percent break strain of the film is about 4.2%. The modulus of the film is about 2.73 GPa.

Example 2

A powder coating composition is prepared by blending 66 parts per hundred by weight (pph) of DER 6508 brand solid epoxy resin (commercially available from The Dow Chemical Company), with: 2.1 pph of AMICURE CG-1200 brand curing agent; 1 pph of EPIKURE P101 brand catalyst; 0.5 pph of MODAFLOW III brand flow modifier; and 30.4 pph of VANSIL W20 brand filler to produce a mixture which is extruded at 90° C., flaked, sieved, and then ground to a powder coating composition having an average diameter of about 30 micrometers. Then 3 pph of the powder coating composition is blended with 97 pph of heated proppant sand at about 60° C. to about 140° C. for three to ten minutes and then cooled to produce an epoxy coating on the proppant sand.

In addition, 380 micrometer thick films are prepared by heating the powder coating composition to about 230° C. for two minutes so that tensile strength, percent break strain and modulus of the films can be determined by test method ASTM D638. The tensil strength of the film is about 59 MPa. The percent break strain of the film is about 2.6%. The modulus of the film is about 3.2 GPa.

Example 3

A powder coating composition is prepared by blending 95.59 parts per hundred by weight (pph) of DER 642U brand solid epoxy resin (commercially available from The Dow Chemical Company), with: 2.27 pph of AMICURE CG-1200 brand curing agent; 1.14 pph of EPIKURE P101 brand catalyst; and 1 pph of MODAFLOW III brand flow modifier to produce a mixture which is extruded at 90° C., flaked, sieved, and then ground to a powder coating composition having an average diameter of about 30 micrometers. Then 3 pph of the powder coating composition is blended with 97 pph of heated proppant sand at about 60° C. to about 140° C. for three to ten minutes and then cooled to produce an epoxy coating on the proppant sand. The onset Tg for this fully cured system is 110° C. and the percent conversion at gel point is about 29%.

Example 4

A powder coating composition is prepared by blending 94.53 parts per hundred by weight (pph) of DER 6508 brand solid epoxy resin (commercially available from The Dow Chemical Company), with: 2.98 pph of AMICURE CG-1200 brand curing agent; 1.49 pph of EPIKURE P101 brand catalyst; and 1 pph of MODAFLOW III brand flow modifier to produce a mixture which is extruded at 90° C., flaked, sieved, and then ground to a powder coating composition having an average diameter of about 30 micrometers. Then 3 pph of the powder coating composition is blended with 97 pph of heated proppant sand at about 60° C. to about 140° C. for three to ten minutes and then cooled to produce an epoxy coating on the proppant sand. The onset Tg for this fully cured system is 155° C. and the percent conversion at gel point is about 40%.

While the present invention may be susceptible to various modifications and alternative forms, the exemplary embodiments discussed above have been shown by way of example. However, it should again be understood that the present invention is not intended to be limited to the particular embodiments disclosed herein. Indeed, the present techniques of the present invention are to cover all modifications, equivalents, and alternatives falling within the spirit and scope of the present invention as defined by the following appended claims.

What is claimed is:

1. A process for producing a proppant particulate substrate having a coating layer thereon, comprising: extruding a solid epoxy resin and a solid curing agent comprising dicyandiamide; flaking the extrudate; sieving the flaked extrudate; and grinding the sieved exturdate to form a thermoset solid powder coating composition; and blending a solid proppant particulate substrate with the thermoset solid powder coating composition at a temperature sufficient to cause the thermoset solid powder coating composition to form a single coat on the proppant particulate substrate, wherein the solid proppant particulate substrate is sand.

2. The process of claim 1, where the thermoset solid powder coating composition includes a composition selected from the group consisting of an epoxy-phenolic composition, an epoxy-polyester composition, an epoxy-resole composition, an epoxy-acrylic composition, an epoxy-amine composition, an epoxy-anhydride composition or mixtures thereof.

3. The process of claim 1, wherein the thermoset solid powder coating composition is an epoxy powder coating composition.

* * * * *